UNITED STATES PATENT OFFICE.

CURTIS J. PATTERSON AND RALPH W. MITCHELL, OF KANSAS CITY, MISSOURI.

BREAD-MAKING.

1,370,354.  Specification of Letters Patent.  Patented Mar. 1, 1921.

No Drawing.  Application filed November 17, 1919. Serial No. 338,727.

*To all whom it may concern:*

Be it known that we, CURTIS J. PATTERSON and RALPH W. MITCHELL, citizens of the United States, residing at Kansas City, in the county of Jackson and State of Missouri, have invented certain new and useful Improvements in Bread-Making; and we do declare the following to be a full, clear, and exact description of the invention, such as will enable others skilled in the art to which it appertains to make and use the same.

This invention relates to a method of making bread and one of the objects thereof is to provide means whereby the keeping qualities of the bread will be materially enhanced due to the fact that the flour in the dough batch will be capable of taking up an amount of moisture in excess of that of which it would ordinarily be capable.

In actual practice we have found that calcium peroxid, if used in the manufacture of bread, necessitates additional moisture in the dough batch in order to produce a dough batch of proper consistency, and as a result the finished product, that is, the baked bread, will possess better keeping qualities than bread made in the ordinary way.

By way of example we recommend about .03 gram of calcium peroxid per pound of flour but obviously the proportion of calcium peroxid may be varied if found expedient. It is not recommended, however, that the calcium peroxid exceed .007 of one per cent. of the flour used. The required moisture to be introduced into the dough batch may be whatever is necessary to make a mass of the proper consistency and the amount can readily be determined by the operator.

We have found by actual practice that bread made by our process has higher moisture-retaining properties than that of bread made by the ordinary method and that, as a result, the keeping properties of the bread are materially enhanced.

The calcium peroxid may be introduced into the dough batch in any convenient manner, preferably at the dough stage of the sponge, if a sponge is prepared, but in a straight dough process it should be incorporated along with the other dough constituents and the treatment of the dough may proceed in the usual manner.

Attention is called to the fact that we have demonstrated that there is no change in the rate of fermentation due to the inclusion of the peroxid in approximately the proportions specified, the particular advantage claimed being that the moisture content of the dough may be increased and as a result the finished loaf will remain moist for a longer period than is possible with bread made with known methods. However, excessive amounts of calcium peroxid may be found to retard fermentation. Of course, it is to be understood that the calcium peroxid may be mixed with the flour preparatory to making up the dough batch but we prefer to introduce it as heretofore explained.

What we claim and desire to secure by Letters-Patent is:

The process of making bread which comprises incorporating with the flour and other ingredients of the dough batch calcium peroxid not to exceed .007 of one per cent. of the flour used whereby the required moisture content of the dough batch for a given consistency is increased.

In testimony whereof we affix our signatures.

CURTIS J. PATTERSON.
RALPH W. MITCHELL.